United States Patent
Franke

(10) Patent No.: US 6,834,605 B1
(45) Date of Patent: Dec. 28, 2004

(54) LOW-RESISTANCE BOAT HULL

(76) Inventor: Peter Franke, 390 Jones Avenue, Toronto, Ontario (CA), M4J 3G3

( * ) Notice: Subject to any disclaimer, the term of this patent is extended or adjusted under 35 U.S.C. 154(b) by 0 days.

(21) Appl. No.: 10/715,497

(22) Filed: Nov. 19, 2003

(51) Int. Cl.$^7$ .................................................. B63B 1/00
(52) U.S. Cl. ................................... 114/61.32; 114/61.3
(58) Field of Search ........................... 114/61.26–61.33, 114/62, 288–290, 292; D12/310, 312

(56) References Cited

U.S. PATENT DOCUMENTS

| | | | |
|---|---|---|---|
| 652,876 A | * | 7/1900 | Andrade, Jr. ............... 114/61.3 |
| 933,426 A | * | 9/1909 | Frost ........................... 114/62 |
| 1,189,227 A | * | 7/1916 | Baker .......................... 114/290 |
| 2,488,183 A | * | 11/1949 | Garmont ...................... 114/62 |
| 3,208,421 A | * | 9/1965 | Landes et al. ............... 114/290 |
| 3,426,717 A | * | 2/1969 | Ivashkov et al. ............. 114/62 |
| 3,800,725 A | * | 4/1974 | L'Heureux ............... 114/61.32 |
| 4,811,676 A | | 3/1989 | Franke |
| 6,138,602 A | | 10/2000 | Cary |
| 6,176,196 B1 | | 1/2001 | Halter |
| 6,354,236 B1 | | 3/2002 | Davidson |
| 6,526,903 B2 | | 3/2003 | Robinson et al. |
| 6,544,081 B1 | | 4/2003 | Paulo |

* cited by examiner

*Primary Examiner*—Andrew D. Wright
(74) *Attorney, Agent, or Firm*—Shoemaker and Mattare

(57) ABSTRACT

A hull configuration having a bow and a stern, for use in a single or multiple hull vessel. The hull configuration has a pair of cutting edges, each cutting edge sloping rearwardly, downwardly and in an outwardly lateral direction, from the bow. Each one of a pair of side edges, extends longitudinally rearwardly and laterally inwardly from an end of a respective one of the cutting edges and smoothly joins together proximal the stern. Each one of a pair of sidewalls extends generally upwardly from a respective one of the cutting edges and from a respective one of the rounded side edges. The sidewalls form a rounded V-shaped section from the point where the side edges meet, extending rearwardly to the stern. An underside includes a concave channel between the cutting edges and between the generally rounded side edges. The channel decreases in width towards the stern and terminates at the point at which the side edges meet.

7 Claims, 3 Drawing Sheets

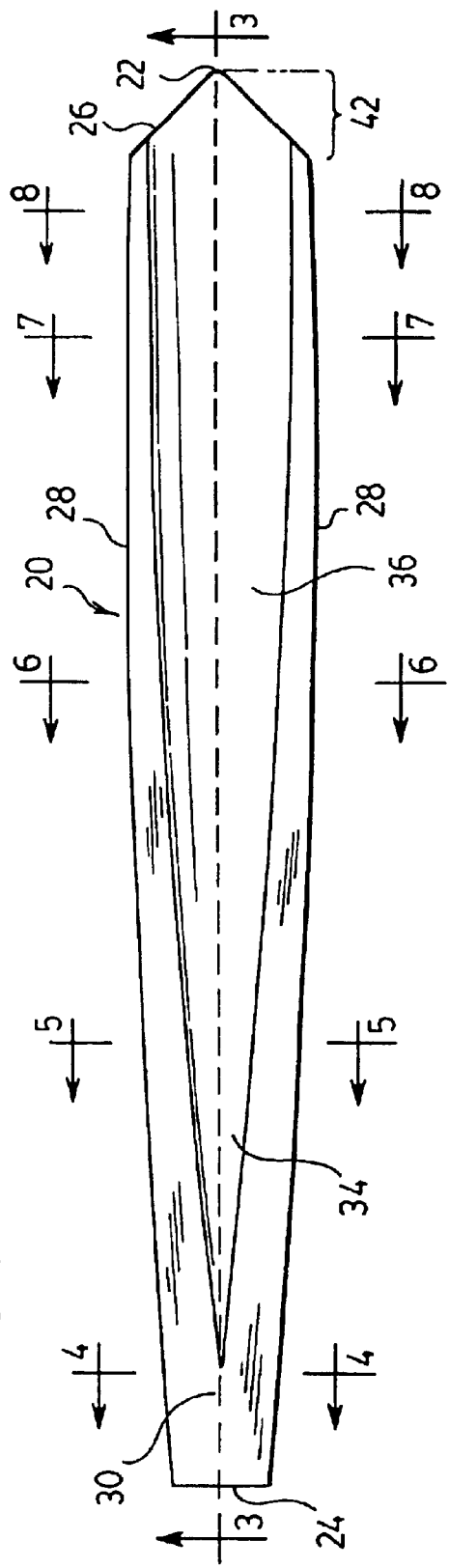
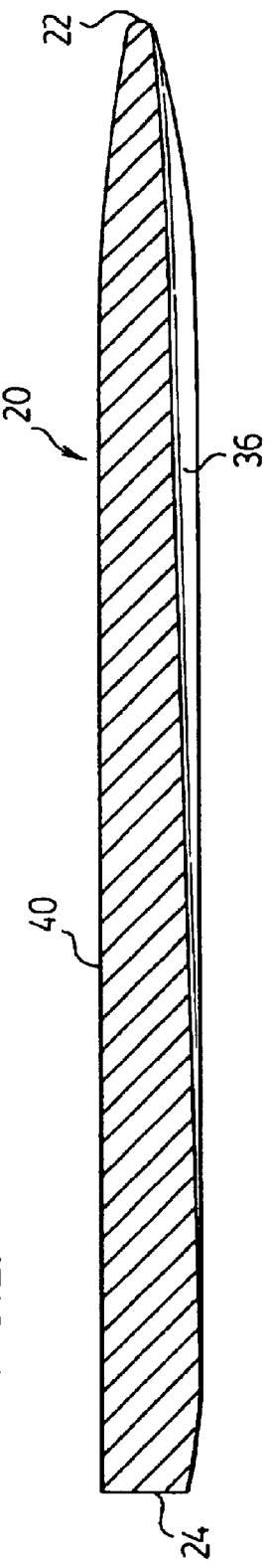
FIG.1.
FIG.2.

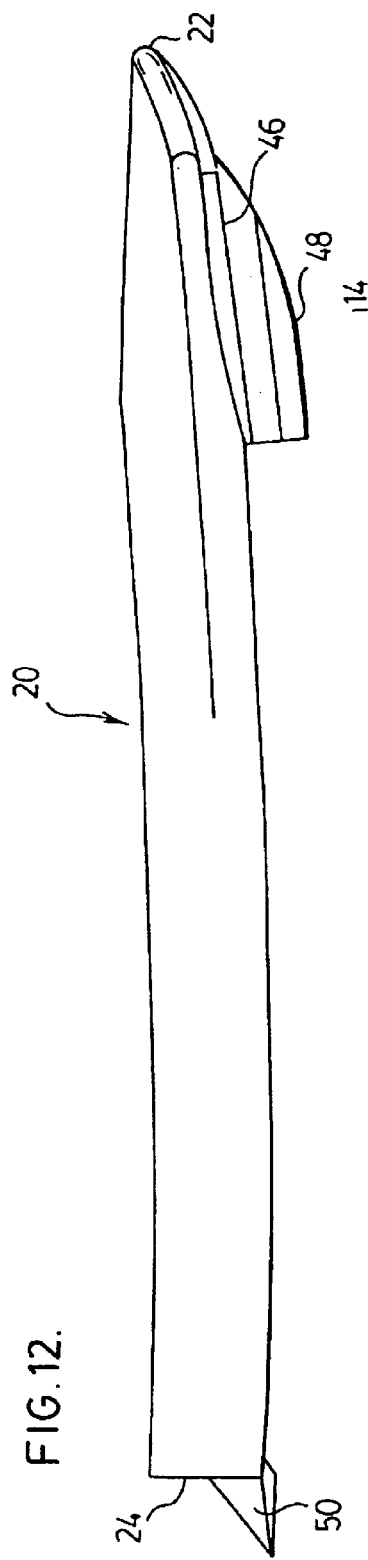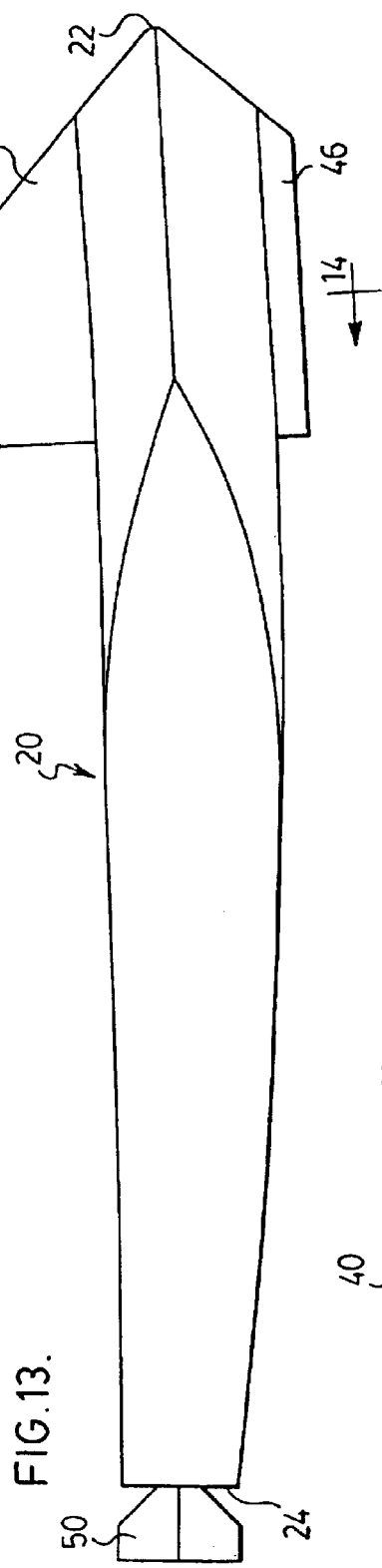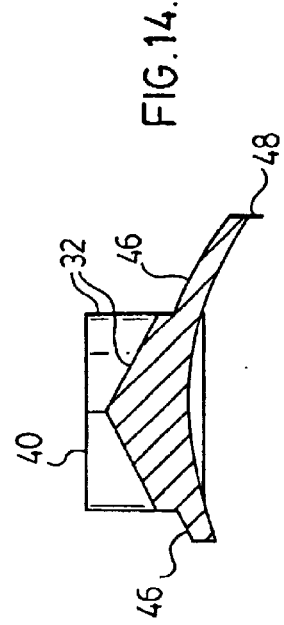

LOW-RESISTANCE BOAT HULL

FIELD OF THE INVENTION

The present invention relates in general to low-resistance elongate boat or ship hulls for use in a single hull or multiple hull watercraft such as kayaks, catamarans, trimarans, or other watercraft.

BACKGROUND OF THE INVENTION

A variety of different boat hull configurations have been developed for use in a variety of watercraft. Continued desire for increased speed and efficiency of boats drives further developments in boat hull configurations.

In certain prior art watercraft, the boat hull is substantially V-shaped for cutting through water when in use. Unfortunately, such V-shaped hulls often lack stability on the water. In other prior art watercraft such as catamarans, flat bottom hulls are employed for the purpose of providing a stable ride. Such hulls, however, provide this stable ride at the cost of speed when travelling on the water. Skin friction is high in these boats as a large surface area of the hull is in contact with the water. Similarly, resistance is high as water is displaced away from the hull forming waves as the hull moves through the water.

In still other prior art watercraft, channels are provided in the hull bottom for producing dynamic lift and trapping air for the purpose of lubricating the hull. Bulbous-nosed hulls have also been employed to reduce the amount of water that has to be accelerated by the bow by allowing water that is in the path of a moving hull to be moved around the hull in the direction of least resistance. The bow used in the present invention saves energy in a similar manner but does not protrude froward like a nose. Instead, the bow in the present invention is an integral part of the hull.

It is an object of an aspect of the present invention to provide a low-resistance hull configuration for single or multiple hull watercraft.

SUMMARY OF THE INVENTION

In one aspect, there is provided a hull configuration comprised of four components that together are greater than the sum of the individual parts. The hull configuration includes a concave bottom forming a channel, a pair of convex cutting edges, a pair of convex side edges and a pair of side walls.

In one aspect of the present invention, there is provided a hull configuration having a bow and a stern, for use in a single or multiple hull vessel. The hull configuration has a pair of cutting edges, each cutting edge sloping rearwardly, downwardly and in an outwardly lateral direction, from the bow. Each one of a pair of side edges, extends longitudinally rearwardly and laterally inwardly from an end of a respective one of the cutting edges and smoothly join together proximal the stern. Each one of a pair of sidewalls extends generally upwardly from respective ones of cutting edges and the rounded side edges, and together the sidewalls form a rounded V-shaped section from the point where the side edges meet, extending rearwardly to the stern. An underside includes a concave channel between the cutting edges and between the generally rounded side edges. The channel decreases in width towards the stern and terminates at the point at which the side edges meet.

Advantageously, skin friction of the boat hull is reduced by reducing the wetted surface area of the hull and by using air that is trapped in the channel to lubricate the hull. Also, the wave-making resistance of the hull is reduced by reducing the acceleration of water in the path of the moving hull. Drag is reduced by reducing the acceleration of the water which is dragged into the space that is vacated by the moving hull.

In one aspect, water is displaced and replaced simultaneously by allowing the movement of water to occur over the entire length of the hull. Water that is moved up by the bow and which is pushed down by the channel also fills in the space that is vacated by the moving hull. Drag is reduced while reducing wave-making resistance by allowing the water to flow from the channel around the convex sides into the space vacated by the moving hull. The water takes the path of least resistance and movement of the hull is facilitated by the convex sides of the hull.

The channel is widest near the bow and narrows down to a point near the stern.

The convex cutting edges are joined to the channel at the bottom, to the sidewalls at the top, to the side edges at their most forward ends and to each other ahead of the channel. At that point, they form the bow. They extend from the bow outwards and rearwards to the widest part of the channel. The cutting edges are widest at the bow and narrowest or sharpest at the opposite end, where they join the side edges.

The convex side edges are joined to the channel at the bottom, to the sidewalls at the top, to the cutting edges at their most rearward ends and to each other to the rear of the channel. At that point they form the stern. The convex side edges extend from the sharpest points of the cutting edges inwards and rearwards to join each other at the stern.

The sidewalls are joined to the top of the convex components, sloping inwardly and up near the bow, straight up at midship and outwards and up towards the stern.

BRIEF DESCRIPTION OF THE DRAWINGS

The invention will be better understood with reference to the drawings and to the following description, in which:

FIG. 1 is a bottom view of a boat hull according to an embodiment of the present invention;

FIG. 2 is a cross-sectional side view of the boat hull of FIG. 1, taken along the lines 3–3;

FIG. 10 is a sectional view of a boat hull according to another embodiment of the present invention, the section taken along a line at a position similar to the position from which FIG. 8 is taken;

FIG. 11 is a sectional view of a boat hull according to another embodiment of the present invention, the section taken along a line at a position similar to the position from which FIG. 8 is taken;

FIG. 12 is a side view of a boat hull, according to another embodiment of the present invention, showing a foil attached to a side edge thereof, FIG. 13 is a top view of the boat hull of FIG. 12; and FIG. 14 is a sectional view of the boat hull of FIG. 13, taken along the line 14—14;

DETAILED DESCRIPTION OF THE PREFERRED EMBODIMENTS

Figure 3:
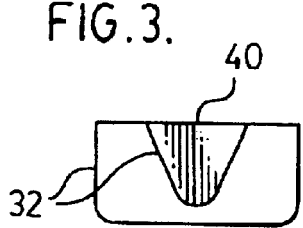
FIG. 3 is a rear view of the boat hull of FIG. 1.
Figure 4:
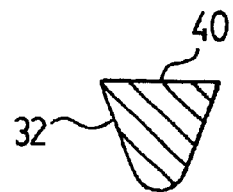
FIG. 4 is a sectional view of the boat hull of FIG. 1, taken along the lines 4—4.
Figure 5:
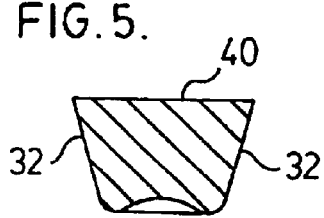
FIG. 5 is a sectional view of the boat hull of FIG. 1, taken along the lines 5—5.
Figure 6:
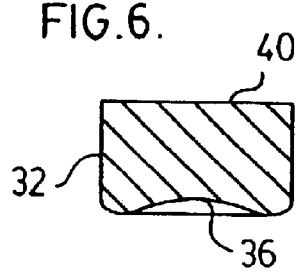
FIG. 6 is a sectional view of the boat hull of FIG. 1, taken along the lines 6—6.

Reference is now made to the drawings to describe a hull configuration in accordance with an embodiment of the present invention. For ease of reference, the hull is described herein in the orientation in which it is used in water. The hull is indicated generally by the numeral 20 and has a bow 22 and a stern 24. The hull 20 includes a pair of cutting edges 26. Each cutting edge slopes rearwardly, downwardly and in an outwardly lateral direction from the bow 22. Each one of a pair of side edges 28 extends longitudinally rearwardly and laterally inwardly from an end of a respective one of the cutting edges 26 and smoothly join together proximal the stern 24 to form a rounded portion of a rounded V-shaped section 30 that extends rearwardly to the stern 24. Each one of a pair of sidewalls 32 extends from a respective one of the side edges 28 and a respective one of the cutting edges 26, and forms a side of the rounded V-shaped section. An underside 34 includes a concave channel 36 that extends between the cutting edges 26 and between the generally rounded side edges 30, decreasing in width towards the stern 24 and terminating at the rounded V-shaped section 30.

The hull will now be described further, with reference to FIGS. 1 to 9. The bow 22 is defined by the convergence of the cutting edges 26 at a blunt point (best shown in FIG. 9). From the bow 22, the cutting edges 26 extend downwardly, rearwardly and laterally outwardly. These cutting edges 26 narrow with distance from the bow 22, thereby becoming more sharp towards the rear thereof. Thus, the cutting edges 26 are sharpest at the lowermost point thereof, for cutting through the water, when the hull 20 is travelling through the water during use.

Each generally rounded side edge 28 extends from the end of a respective one of the cutting edges 26 (the lower most point of the cutting edges 26) toward the stern 24. As previously described, the side edges 28 extend longitudinally rearwardly and laterally inwardly and converge near the stern 24 at the rounded V-shaped section 30 which is at a rearward portion of the hull 20. Clearly the rounded V-shaped section 30 has a rounded V-shaped cross section. The bottom of the rounded V-shaped section 30, formed by the convergence of the side edges 28, extends upwardly towards the stern 24. Thus, the lowermost point of the bottom of the rounded V-shaped section 30 is at the convergence point of the side edges 28. From there, the bottom of the rounded V-shaped section 30 extends upwardly towards the stern 24.

Figure 7:
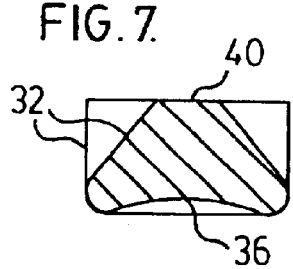
FIG. 7 is a sectional view of the boat hull of FIG. 1, taken along the lines 7—7.

The sidewalls 32 extend rearwardly from the cutting edges 26 and from the rounded side edges 28, toward the stern 24. Each sidewall 32 extends generally upwardly and inwardly (towards each other) at the forward portion of the hull 20. At the mid-point of the hull 20, the sidewalls 32 extend generally vertically to a top deck 40. Proximal the stern 24, the sidewalls 32 extend generally upwardly and outwardly to the top deck 40. Clearly the sidewalls 32 form the sides of the generally rounded V-shaped section 30 proximal the stern 24. As shown in FIGS. 1–9, the sidewalls 32 transition smoothly from the bow 22 to the stern 24, forming a smooth rearward spiral. It can be seen that the sidewalls 32 extend upwardly only partially to the level of the top deck 40, at a forward portion 42 of the hull 20 proximal the bow 22. A short distance from the bow 22, however, the sidewalls 32 extend upwardly to the top deck 40 as best shown in FIG. 7.

The underside of the bow 22 of the boat begins as a convex end that smoothly transitions to flat and then to the concave channel 36.

The underside of the hull 20 includes the concave channel 36 that begins at the bow 22 and extends between the cutting edges of 26 and between the side edges 28, to the convergence point of the side edges 28. Clearly, the width of the channel 36 decreases with the convergence of the side edges 28 and the channel 36 ends at the convergence point of the side edges 28. As best shown in FIG. 2, the depth of the channel decreases towards the convergence point of the side edges 36. Thus, the depth of the channel 36 is greater at the section shown in FIG. 7 than at the section shown in FIG. 5. Thus, the underside of the hull 20 gradually changes from a concave surface in FIG. 8 to a generally flat surface to a convex surface in FIG. 4.

The hull 20 as described herein is made of any suitable material. For example, in one embodiment, the hull 20 is made of wood. In this embodiment, plywood is twisted to form the sidewalls 32. In an alternative embodiment, the hull 20 is made of metal. In this embodiment, sheet metal is twisted to form the sidewalls 32. The side edges 28 are formed of a metal pipe that is split longitudinally along a portion thereof to provide the two generally rounded side edges 28 that converge together. Plastic pipes or tubing are also possible and provide an inexpensive, light and strong alternative. When using plastic pipes, one-piece plastic pipes from bow to stern are possible.

Figure 10:
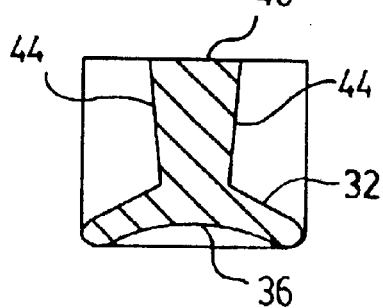

While specific embodiments of the hull 20 have been described herein, it will be understood that variations and modifications to these embodiments are possible. For example, in the above described embodiments, the sidewalls 32 extend upwardly only partially to the level of the top deck 40 at the forward portion 42 of the hull 20. In an alternative embodiment, such as that shown in FIG. 10, a second pair of sidewalls 44 extend upwardly from the sidewalls 32 substantially to the level of the top deck 40 at the forward portion 42.

Figure 8:
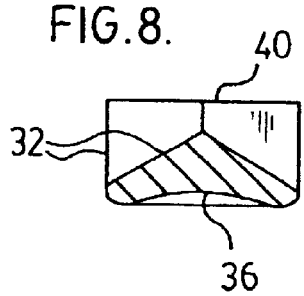
FIG. 8 is a sectional view of the boat hull of FIG. 1 taken along the lines 8—8.
Figure 9:
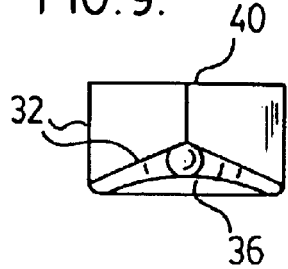
FIG. 9 is a front view of the boat hull of FIG. 1.
Figure 11:
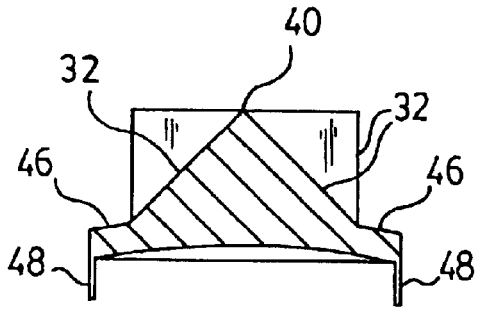

FIG. 11 shows a sectional view of the boat hull 20, according to another embodiment of the present invention. The sectional view that is shown in this FIG. 11 is taken along a line at a position that is similar to the position from which FIG. 8 is taken. The embodiment shown in FIG. 11 clearly includes a pair of foils 46 extending from the side edges 28, each foil 46 extending from a respective one of the side edges 28. In this embodiment, the foils 46 extend from a forward portion of the side edges 28 only. A pair of keels 48 extend from the foils 46 with each keel 48 extending from a respective one of the keels 48.

FIGS. 12 to 14 show a boat hull according to yet another embodiment of the present invention. In this embodiment, a pair of foils 46 extend from the lower part of the forward portions of the side edges 28, each foil 46 extending from a respective one of the side edges 28. Clearly, one of the foils 46 is wider than the other in that the wider foil 46 extends further from the respective side edge 28. The foil 46 that is wider and extends further from the respective side edge compared to the other foil 46, is located on the windward side of the leeward hull. In this embodiment, a single keel 48 extends from the wider foil 46. Thus, a keel 48 is provided on one side of the hull 20 only. This foil 36 and keel 48 increase lateral resistance and the foil 46 directly opposes the pressure of a sail of the boat (not shown), which bears down on the leeward hull. In the embodiment shown in FIGS. 12 to 14, there is also included an additional foil 50 attached to the stern 24 of the hull.

Other variations and modifications are possible. For example, the size and shape of many of the elements can vary. Also, the sidewall configuration can vary. For example, when used in a kayak or as pontoons on a float plane, the sidewalls 32 slope inwardly along the entire length of the hull 20. Also, the hull 20 can be used as a buoyant keel, on the bottom of a larger hull. The exact size and shape of the components described herein can vary and can be experimentally or otherwise determined.

Those skilled in the art may conceive of further variations and modifications. All such variations and modifications are believed to be in the sphere and scope of the present invention.

What is claimed is:

1. A hull configuration having a bow and a stern, for use in a single or multiple hull vessel, the hull configuration comprising:
   a pair of cutting edges, each cutting edge sloping rearwardly, downwardly and in an outwardly lateral direction, from said bow;
   a pair of generally rounded side edges, each side edge extending longitudinally rearwardly and laterally inwardly from an end of a respective one of said cutting edges and smoothly joining together proximal said stern;
   a pair of sidewalls, each sidewall extending generally upwardly from a respective one of said cutting edges and from a respective one of said rounded side edges, said sidewalls forming a rounded V-shaped section from the point where the side edges meet, extending rearwardly to the stern; and
   an underside including a concave channel between said cutting edges and between said generally rounded side edges, said channel decreasing in width towards the stern and terminating at the point at which the side edges meet,
   wherein each of said sidewalls spiral rearwardly from a respective one of said cutting edges and along a respective one of said side edges, and wherein each of said sidewalls extend inwardly and upwardly proximal the bow, substantially vertically at a midpoint between the bow and the stern and outwardly and upwardly at the stern.

2. The hull configuration according to claim 1, wherein said rounded V-shaped section extends rearwardly and upwardly from a forward end thereof to said stern.

3. The hull configuration according to claim 1, further comprising a stern foil extending from the stern of the hull.

4. A hull configuration having a bow and a stern, for use in a single or multiple hull vessel, the hull configuration comprising:
   a pair of cutting edges, each cutting edge sloping rearwardly, downwardly and in an outwardly lateral direction, from said bow;
   a pair of generally rounded side edges, each side edge extending longitudinally rearwardly and laterally inwardly from an end of a respective one of said cutting edges and smoothly joining together proximal said stern;
   a pair of sidewalls, each sidewall extending generally upwardly from a respective one of said cutting edges and from a respective one of said rounded side edges, said sidewalls forming a rounded V-shaped section from the point where the side edges meet, extending rearwardly to the stern; and
   an underside including a concave channel between said cutting edges and between said generally rounded side edges, said channel decreasing in width towards the stern and terminating at the point at which the side edges meet, wherein said cutting edges narrow to form gradually sharper edges from said bow toward s a rear of said cutting edges.

5. A hull configuration having a bow and a stern, for use in a single or multiple hull vessel, the hull configuration comprising:
   a pair of cutting edges, each cutting edge sloping rearwardly, downwardly and in an outwardly lateral direction, from said bow;
   a pair of generally rounded side edges, each side edge extending longitudinally rearwardly and laterally inwardly from an end of a respective one of said cutting edges and smoothly joining together proximal said stern;
   a pair of sidewalls, each sidewall extending generally upwardly from a respective one of said cutting edges and from a respective one of said rounded side edges, said sidewalls forming a rounded V-shaped section from the point where the side edges meet, extending rearwardly to the stern; and
   an underside including a concave channel between said cutting edges and between said generally rounded side edges, said channel decreasing in width towards the stern and terminating at the point at which the side edges meet, further comprising a pair of foils extending from portions of the side edges proximal the bow.

6. The hull configuration according to claim 5, further comprising a keel extending from the other of said foils.

7. The hull configuration according to claim 6, further comprising a second keel extending from the other of said foils.

* * * * *